April 7, 1953         F. L. SCHNEIDER         2,633,931
METHOD FOR DECONTAMINATING HOT WET GASES OR STEAM
Filed Oct. 2, 1948
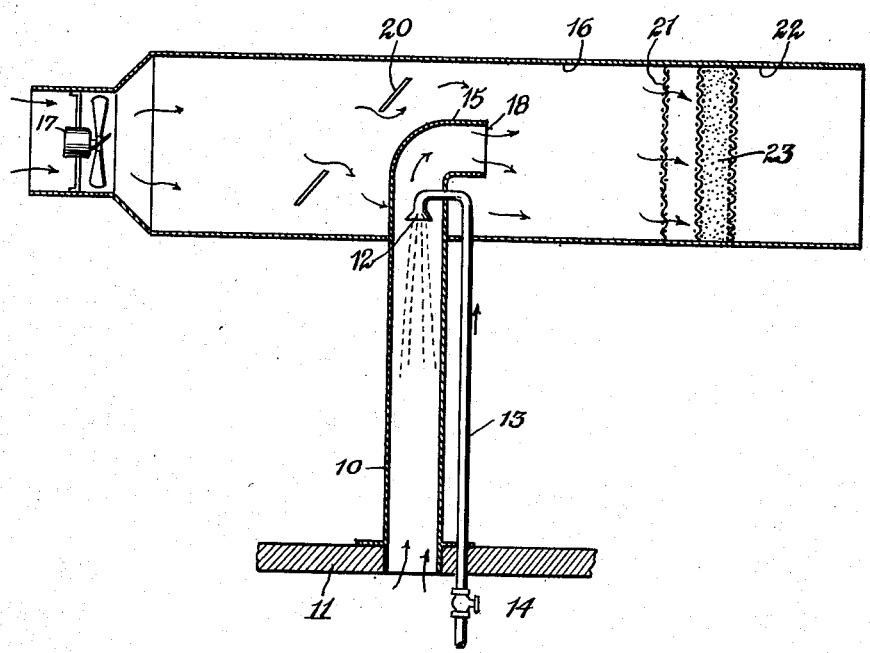
INVENTOR.
Frank L. Schneider
BY
Munn, Liddy & Glaccum
Attorneys Patented Apr. 7, 1953

2,633,931

UNITED STATES PATENT OFFICE 2,633,931

METHOD FOR DECONTAMINATING HOT WET GASES OR STEAM

Frank L. Schneider, Douglaston, N. Y.

Application October 2, 1948, Serial No. 52,522

2 Claims. (Cl. 183—114.2)

In certain types of manufacture, exhaust gases are developed which are contaminated with foreign matter or gases. Before these gases may be exhausted to the atmosphere they must be cleansed of the objectionable matter which may constitute repugnant odors or material which would stain surrounding buildings.

In the past, methods have been used to remove the contamination from steam or wet gases by the condensation or removal of the water before the actual decontamination treatment. This is not always practical as there are many localities where there is insufficient water to cool condensers or where, because of local circumstances, it is impossible to dispose of the condensed contaminated steam.

An object of this invention is to provide a method which avoids the condensation of the steam or water vapor but which permits the use of decontamination methods which require a low temperature. One of the best known methods of decontaminating gases is to pass the gas through a screen or bed of activated charcoal or other material. It cannot be used with saturated steam at high temperatures since steam tends to reactivate the carbon and release the decontamination.

Another object of this invention is to provide a method whereby sufficient additional air or other inert gas is added to the steam or wet gas to bring a concentration of water vapor to or below the saturation concentration at the desired low temperature. The condensation of water vapor during the subsequent decontamination treatment is thus avoided.

In the accompanying drawing I have shown a diagrammatic sketch which indicates generally the improvement of my method. It will be understood that this sketch is merely illustrative of the method involved and that the method is not limited to the apparatus shown.

Referring more particularly to the drawing, I provide a stack 10 through which the exhaust gases leave the building or other chamber through the roof 11. If these gases contain considerable solid matter it may be desirable to subject them to a water spray 12 fed by the pipe 13, the amount of spray being controlled by the valve 14. At the top of the stack 10 is an elbow 15 through which the gases are discharged into the mixing chamber 16. Air or other inert gas is pumped into the chamber 16 by means of a compressor fan 17, the volume of air being substantially larger than the volume of steam. It will be seen that the air or other gases will be driven past the orifice 18 of the elbow 15, thus sucking and thoroughly mixing with the steam or wet gas. The size of the chamber 16 will depend upon the particular problem involved. If the steam is at high pressure a larger expansion chamber can be used. Various baffles such as that indicated at 20 may be used to increase the turbulence and to assure a complete mixture. After the gases have been thoroughly mixed they will flow through the screen 21 into the adsorption chamber 22 where they may be subjected to the purifying action of activated carbon 23, silica jell or be subjected to electrical precipitation to secure the removal of the objectionable material. The decontaminated steam may then be released to the air.

While my method is not to be limited to this application it is particularly useful in the manufacture of items where resins or pigments are free since these products if released in concentrated steam will strain the countryside and surrounding buildings and produce a heavy odor, particularly under humid conditions.

I claim:

1. The method of decontaminating contaminated hot wet gas with a decontaminating agent, efficient only at temperatures substantially below the temperature of the gas, which comprises directly adding to the gas to be decontaminated a sufficient quantity of air at a predetermined adaptable temperature to cool the gas to a predetermined point and to lower the concentration of the vapor in the gas to or below the saturation point thereof at said adaptable temperature and then passing said mass through a decontaminating agent of the group consisting of activated carbon and silica jell.

2. A method of decontaminating contaminated steam before releasing it to the atmosphere which comprises directly mixing with said steam a sufficient quantity of cool air to cool the gas to a predetermined point and to lower the concentration of the vapor in the gas to or below the saturation point thereof where the contaminating material may be screened out by activated carbon and passing said gas through a screen of activated carbon to the atmosphere.

FRANK L. SCHNEIDER.

REFERENCES CITED

The following references are of record in the file of this patent:

UNITED STATES PATENTS

| Number | Name | Date |
|---|---|---|
| 1,265,893 | Eustis | May 14, 1918 |
| 1,548,280 | Ray | Aug. 4, 1925 |
| 1,917,725 | Lenander | July 11, 1933 |
| 2,064,468 | Foster | Dec. 15, 1936 |
| 2,140,140 | Punnett | Dec. 13, 1938 |
| 2,268,464 | Seippel | Dec. 30, 1941 |
| 2,518,312 | Hartig | Aug. 8, 1950 |
| 2,525,206 | Clarke | Oct. 10, 1950 |

FOREIGN PATENTS

| Number | Country | Date |
|---|---|---|
| 478,486 | Great Britain | Jan. 19, 1938 |